June 11, 1929.	P. KAISER	1,716,892
EGG TRAY FOR INCUBATORS
Filed Oct. 4, 1924
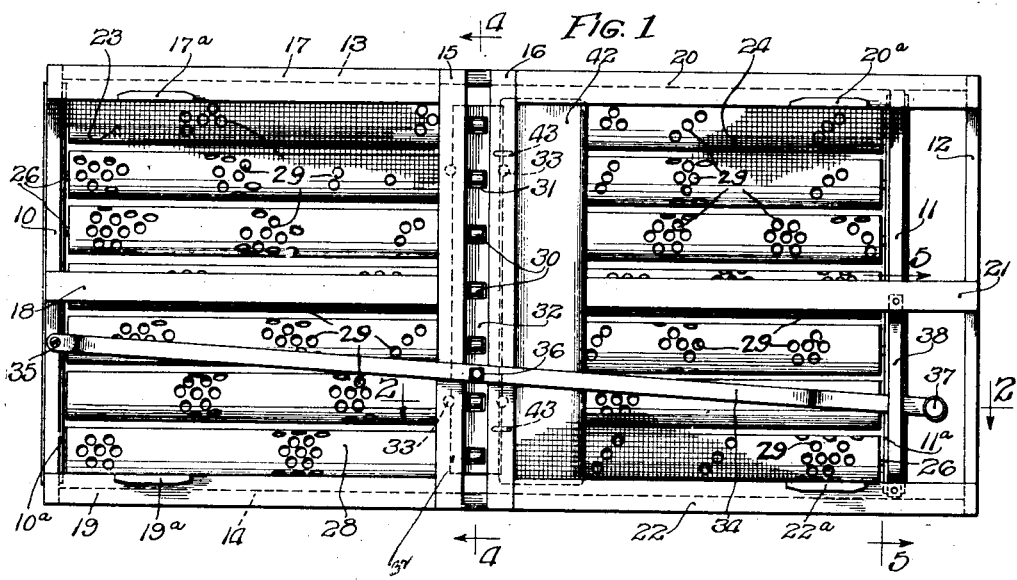
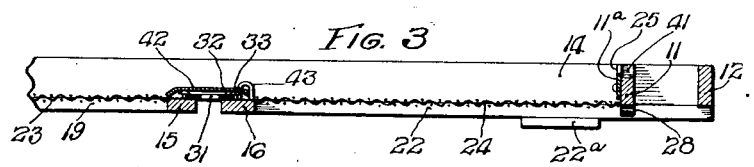
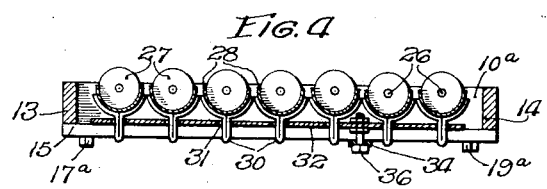
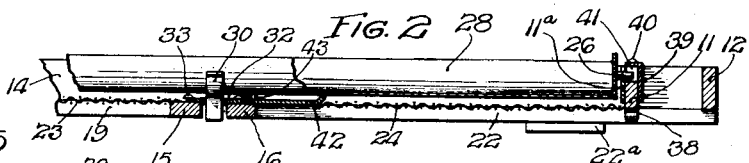
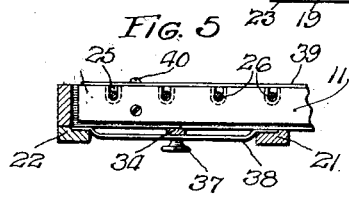
INVENTOR
Peter Kaiser
BY John Howard McElroy
HIS ATTY Patented June 11, 1929.

1,716,892

UNITED STATES PATENT OFFICE.

PETER KAISER, OF CROWN POINT, INDIANA, ASSIGNOR TO 103° INCUBATOR COMPANY, OF CROWN POINT, INDIANA, A CORPORATION OF INDIANA.

EGG TRAY FOR INCUBATORS.

Application filed October 4, 1924. Serial No. 741,531.

My invention is concerned with egg turning trays for incubators, and is designed to produce a simple device of the class described in which all the eggs in a tray of any desired size can be instantly turned, and securely held in either of two positions to which they are normally turned. It is further concerned with such a structure in which the reciprocating troughs or holders which normally hold the eggs can be quickly removed just before the eggs hatch, and in which the troughs can be as quickly replaced when the incubator is to be charged again with a fresh setting of eggs.

My invention is further concerned with a specific construction whereby a unitary egg tray of large capacity can be constructed so as to be simple in its structure and light in weight so that it can be readily handled. To this end, it consists of a rigid, rectangular supporting frame of considerable length, having skeleton-like light-weight egg trays mounted in the ends thereof and supported at their central portions by the mechanism by which they are reciprocated, so that they will be supported at their centers and cannot sag in spite of their unusual length and light-weight construction.

It is also concerned with such a tray in which the reciprocating mechanism operable from the end is all in the same horizontal plane as the tray so that the latter can be removed bodily together with the reciprocating mechanism through a side door having substantially the same size as the cross-sectional dimensions of the egg tray, without detaching or removing the egg turning or reciprocating mechanism.

To illustrate my invention, I annex hereto a sheet of drawings in which the same reference characters are used to designate identical parts in all the figures, of which—

Fig. 1 is an inverted plan view of a tray containing my invention;

Fig. 2 is a vertical section on the line 2—2 of Fig. 1 with the troughs in place;

Fig. 3 is a similar view with the troughs removed and the bridge in place;

Figs. 4 and 5 are vertical sections on the lines 4—4 and 5—5 of Fig. 1; and

Fig. 6 is a perspective view of a portion of one of the troughs.

In carrying out my invention in its preferred form, I employ a wooden framework having the end pieces 10 and 11 and preferably the supplemental end piece 12, connected by the two side pieces 13 and 14 of the same depth. Across the bottom near the center are the two wooden strips or pieces 15 and 16, and of the same depth as these two pieces and extending therefrom to the ends of the frame are the six bottom pieces 17, 18, 19, 20, 21 and 22. On the bottom pieces 17, 19, 20 and 22, I preferably place the short strips 17$^a$, 19$^a$, 20$^a$, and 22$^a$, which strips serve to elevate the tray when placed on any flat surface and prevent any metal from touching the tray. The bottom pieces 17, 18 and 19 are supplemented by the wire mesh bottom 23 and the bottom pieces 20, 21 and 22 are likewise supplemented by the wire mesh 24 secured to cover all the bottom space except that between the cross pieces 15 and 16, but it will be noted that most of this wire mesh is removed in Fig. 1 to show the parts above it.

The end pieces 10 and 11 are provided on their adjacent vertical faces with the metallic strips 10$^a$ and 11$^a$, these strips having the recesses 25 therein to receive and form a substantially everlasting bearing for the metallic pintles 26 which are secured to and project outwardly from the circular sheet metal ends 27 of the sheet metal troughs or holders 28, which, as best seen in Fig. 6 are constructed of a cylindrical form and extend through say 240 degrees of a complete circle, forming a trough in which the eggs can be quickly placed, and in order to lighten these troughs and insure more perfect ventilation, I preferably form in them the numerous perforations or apertures 29 which remove a very considerable portion of the sheet metal stock of which they are composed, and these troughs are also preferably galvanized to prevent rust. To shift all of these troughs at the same time I secure on the bottom of each trough at the center a downwardly projecting lug 30, which are preferably constructed of strips of sheet metal formed in substantially a Y-shape and soldered in place on the troughs. Each of these lugs 30 extends into the corresponding aperture 31 formed in the body of the preferably metallic slide 32, which consists of a strip of sheet metal sliding on top of the adjacent edges of the cross pieces 15 and 16, and held in place by the four or more overhanging pins 33, seen in dotted lines in Fig. 1, which are driven or otherwise secured on the upper surfaces of the wooden cross pieces 15 and 16. To shift these strips 32, I provide a long, preferably metallic lever or bar 34, which is fulcrumed at 35 on the under side of the end piece 10 and is connected near its center by the bolt or pin 36 with the slide 32, and which has its other end with the operating finger piece 37 extended between the end pieces 11 and 12, and preferably supported as seen in Fig. 5, by the short metallic strip 38 extending between and supported by the bottom pieces 21 and 22. To secure the troughs in place in such a manner that they can be readily removed I provide on the end piece 11, and preferably on the end piece 10, a metallic strip 39, preferably formed of angle iron, and secured in place by the screws 40. The slots 25 register with the larger slots 41 formed in the wooden end pieces, so that all the wear is taken by the metal strips 10ª and 11ª, and the amount of the friction of the pintles 26 is thereby reduced.

The operation of the apparatus will be readily apparent: When the tray is filled with eggs, the lever 37 is shifted to one extreme position or the other, and every day, it is shifted to the other extreme position, thus turning all the eggs by the single movement of the lever through an angle of say 90 degrees, and thus preventing any possibility of the germ adhering to the shell of the egg and preventing its hatching. When the eggs begin to pip, one or both of the strips 39 can be removed by taking out the screws 40, and then the troughs can be carefully rotated to allow the eggs to drop onto the bottom immediately adjacent them, and the troughs removed. When the troughs are removed, that would leave the apertures 31 in the plate 32 exposed, and to prevent the chickens possibly getting their feet through said apertures and breaking their legs I provide the bridge plate 42, which consists of a strip of sheet metal, slightly dished at its center, as seen, and hinged at one side to the cross-piece 16 by the staples 43, so that it can be turned from the normal position shown in Fig. 2 in which it is not in use to the position shown in Fig. 3 where it is used and serves to bridge the plate 32 and cover the recesses 31. When the hatch has been completed and it is desired to set a fresh lot of eggs, the troughs are replaced as readily as they were removed.

While I have shown and described my invention as embodied in the form which I at present consider best adapted to carry out its purposes, it will be understood it is capable of modifications, and that I do not desire to be limited in the interpretation of the following claims except as may be necessitated by the state of the prior art.

What I claim as new and desire to secure by Letters Patent of the United States is:

1. In an egg tray for incubators, the combination with a long frame, of a series of elongated parallel egg holders pivotally mounted at their ends in the ends of the frame, a slide extending transversely beneath the holders located toward the center of the frame and supporting them and itself supported throughout its length by the frame, connections between the slide and the holders near their centers whereby the longitudinal movement of the slide will swing the holders, and means for shifting the slide operable from one of the ends of the tray, and consisting of a lever fulcrumed at one end of the tray and connected to the slide toward the center, while its other end extends to the other end of the tray.

2. In an egg tray for incubators, the combination with a long frame, of a series of elongated parallel egg holders pivotally mounted at their ends in the ends of the frame, a slide extending transversely beneath the holders located toward the center of the frame and supporting them and itself supported throughout its length by the frame, connections between the slide and the holders near their centers whereby the longitudinal movement of the slide will swing the holders, and means for shifting the slide operable from one of the ends of the tray, and consisting of a lever fulcrumed at one end of the tray and connected to the slide toward the center, while its other end extends to the other end of the tray, said lever being provided with a supporting strip for its free end.

3. In an egg tray for incubators, the combination with a frame having permanent bottom portions across its ends and approaching each other at the center with a gap between said portions, of a series of parallel egg holders pivotally and removably mounted at their ends in the ends of the tray, means for swinging the holders located in said gap, and a plate pivoted at one side to one bottom portion and adapted when the holders are removed to be swung over the gap to bridge the same.

4. In an egg tray for incubators, the combination with a frame having wooden end portions, of a metal plate secured on the inside of one of the ends and having bearing recesses formed therein registering with recesses formed in said end portion, a series of parallel egg holders having pintles at their ends journaled in said recesses, means for turning the holders simultaneously, and a metal strip removably secured over the end having the bearing recesses extending to the top of the plate to close said recesses, substantially as and for the purpose described.

5. In an egg tray for incubators, the combination with a long frame open at the top and bottom but having rigid sides and ends, of a series of correspondingly elongated light-weight skeleton-like parallel egg holders pivotally mounted at their ends in the ends of the frame, each extending substantially the entire length of the interior of the frame, a pair of supporting members connecting the sides of the frame toward the center thereof, a slide extending transversely of the holders and mounted to reciprocate longitudinally on the supporting members by which it is supported throughout its length, and connections between the slide and the holders whereby the slide supports the center of the holders and its longitudinal movement will swing them.

6. In an egg tray for incubators, the combination with a long frame open at the top and bottom but having rigid sides and ends, of a series of correspondingly elongated light-weight skeleton-like parallel egg holders pivotally mounted at their ends in the ends of the frame, each extending substantially the entire length of the interior of the frame, a pair of supporting members connecting the sides of the frame toward the center thereof, a slide extending transversely of the holders and mounted to reciprocate longitudinally on the supporting members by which it is supported throughout its length, connections between the slide and the holders whereby the slide supports the center of the holders and its longitudinal movement will swing them, and means for shifting the slide operable from one of the ends of the tray.

In witness whereof, I have hereunto set my hand this 29th day of September, 1924.

PETER KAISER.